United States Patent [19]

Ritter

[11] Patent Number: 4,518,572

[45] Date of Patent: May 21, 1985

[54] METHOD OF WASHING HYDROGEN SULFIDE FROM COKE OVEN GAS BY THE AMMONIUM SULFIDE METHOD

[75] Inventor: Horst Ritter, Essen, Fed. Rep. of Germany

[73] Assignee: Dr. C. Otto & Comp. G.m.b.H., Bochum, Fed. Rep. of Germany

[21] Appl. No.: 570,087

[22] Filed: Jan. 12, 1984

Related U.S. Application Data

[63] Continuation-in-part of Ser. No. 302,806, Sep. 16, 1981, abandoned.

[30] Foreign Application Priority Data

Sep. 24, 1980 [DE] Fed. Rep. of Germany ....... 3035895

[51] Int. Cl.³ .............................................. B01D 53/34
[52] U.S. Cl. .................................... 423/234; 423/238
[58] Field of Search ............... 423/220, 224, 234, 238, 423/237

[56] References Cited

U.S. PATENT DOCUMENTS

| | | | |
|---|---|---|---|
| 2,878,099 | 3/1959 | Breuing et al. | 423/233 |
| 2,884,304 | 4/1959 | Grosskinsky et al. | 423/234 |
| 3,789,105 | 1/1974 | Tippmer et al. | 423/234 |
| 4,009,243 | 2/1977 | Weber et al. | 423/238 X |

*Primary Examiner*—Earl C. Thomas
*Attorney, Agent, or Firm*—Thomas H. Murray; Clifford A. Poff

[57] ABSTRACT

An improved coke oven gas washing process for removing hydrogen sulfide is proposed wherein the coke oven gas is treated in a hydrogen sulfide scrubber by counterflow with an aqueous ammonia wash water. A stream of aqueous weak ammonia liquor is cooled and sprayed through nozzles in the mid-region of the hydrogen sulfide scrubber. A quantity of aqueous ammonia liquor, corresponding to the quantity which is sprayed through the said nozzles, is withdrawn from the hydrogen sulfide scrubber at a level below the nozzles and is introduced into the top of the said hydrogen sulfide scrubber. Ammonia vapor released at the nozzles has a higher partial pressure than the ammonia partial pressure of the coke oven gas in the region of the nozzle. The aqueous ammonia liquor from the deacidifier is the source of the cooled aqueous ammonia liquor which is introduced through the nozzles. A portion of the aqueous ammonia liquor from the deacidifier is introduced directly into the top of the hydrogen sulfide scrubber as a portion of the required aqueous ammonia wash water.

4 Claims, 1 Drawing Figure

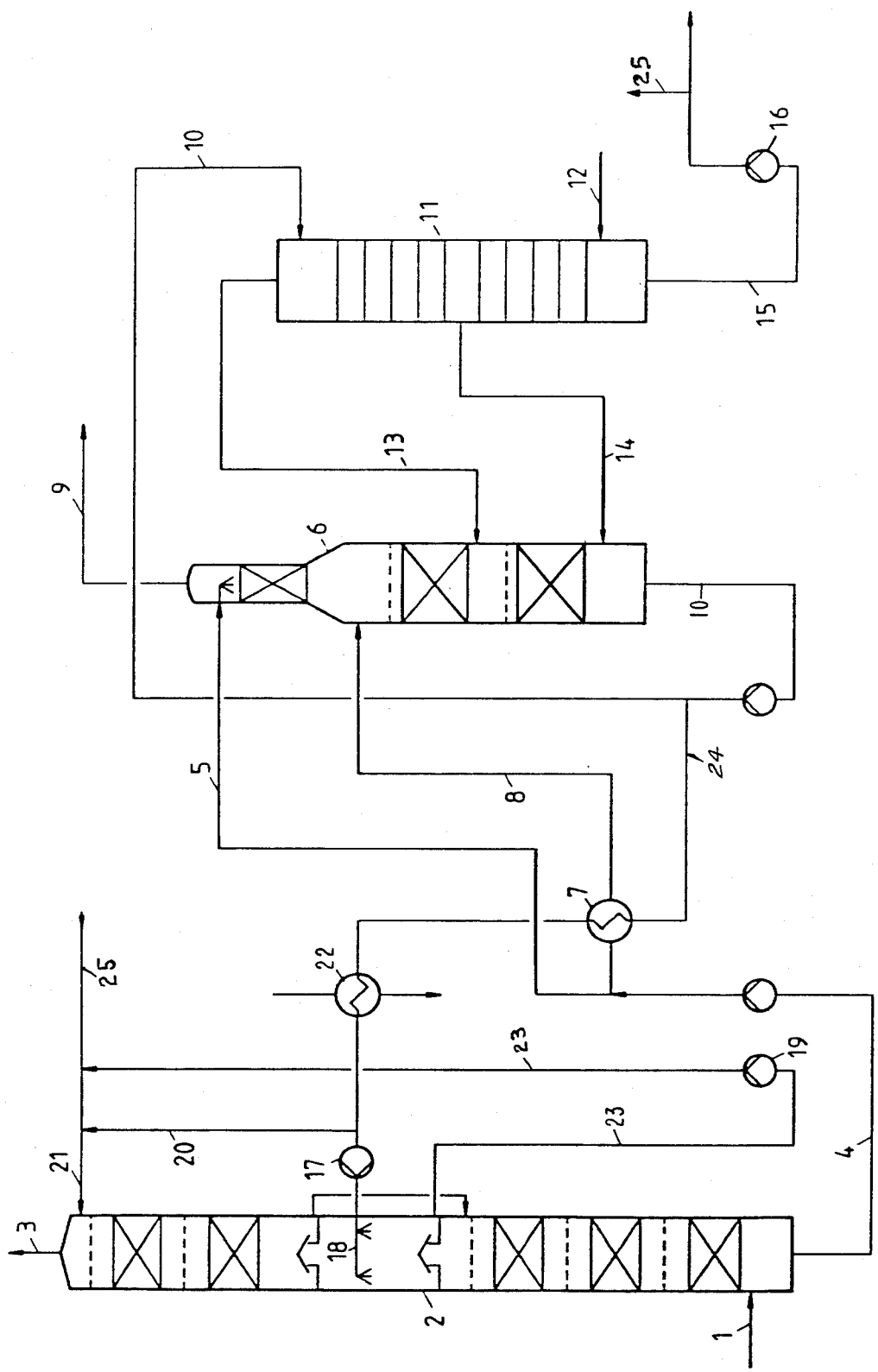

METHOD OF WASHING HYDROGEN SULFIDE FROM COKE OVEN GAS BY THE AMMONIUM SULFIDE METHOD CROSS REFERENCES TO RELATED APPLICATIONS

This application is a continuation-in-part of co-pending U.S. patent application Ser. No. 302,806 filed Sept. 16, 1981 and abandoned herewith.

STATEMENT OF THE INVENTION

This invention relates to an improvement in the ammonium sulfide process for removing hydrogen sulfide from coke oven gas.

BACKGROUND OF THE INVENTION

Description of the Prior Art:

In the ammonium sulfide process for removing hydrogen sulfide from coke oven gas, the coke oven gas containing hydrogen sulfide is introduced into the bottom of a hydrogen sulfide scrubber. Aqueous ammonia wash water is introduced into the top of the hydrogen sulfide scrubber. Cleaned coke oven gas, containing a reduced amount of hydrogen sulfide, is withdrawn from the top of the hydrogen sulfide scrubber. An aqueous ammonia liquor, containing dissolved hydrogen sulfide, is withdrawn from the bottom of the hydogen sulfide scrubber. In a typical installation, a deacidifier also is employed. The aqueous ammonia liquor, containing dissolved hydrogen sulfide, is delivered from the base of the hydrogen sulfide scrubber to the top of a deacidifier where it is countercurrently contacted with ammonia or aqueous ammonia solutions. A hydrogen sulfide gas product is recovered from the top of the deacidifier. An aqueous ammonia liquor is withdrawn from the base of the deacidifier and introduced as a portion of the aqueous ammonia wash water in the hydrogen sulfide scrubber.

A further refinement known in the art employs an ammonia scrubber for recovering ammonia gas and ammonia-rich aqueous vapors or liquids from at least a portion of the aqueous ammonia liquor which is withdrawn from the base of the deacidifier. The ammonia stripper yields ammonia gas and ammonia-rich aqueous liquids as product and also generates an aqueous liquor which is a weak ammonia aqueous solution and which may be employed at least in part as aqueous ammonia wash water in the top of the hydrogen sulfide scrubber.

It is known that the efficiency with which hydrogen sulfide is washed from coke oven gas can be considerably increased if ammonia is washed out simultaneously with hydrogen sulfide in the hydrogen sulfide scrubber. Absorption of ammonia in the hydrogen sulfide scrubber can be achieved by increasing the ammonia content of the coke oven gas; by recycling ammonia; and by simultaneously keeping the ammonia content of the scrubbing water at a low value. Heretofore the ammonia required for recycling has been obtained by withdrawing vapors from the top of an ammonia stripper or by employing coke oven gas to strip hot, deacidified recycle aqueous liquor. Corrosion of the equipment is accelerated by using the concentrated vapors from the top of the ammonia stripper and also by using hot, deacidified recycle aqueous liquor.

DESCRIPTION OF THE INVENTION

The object of this invention is to provide a convenient, advantageous method for supplying ammonia required in recycling in a coke oven gas washing installation.

According to the invention, recycle aqueous liquor from a deacidifier is cooled to a low temperature from 20 to 35 degrees C., typically about 25 degrees C. The cooled recycle aqueous liquor is a weak ammonical solution having an ammonia content of 15 to 25 grams per liter, typically about 17 grams per liter. Because the solution is cooled, the partial pressure of ammonia gas for the cooled solution is correspondingly relatively low, from 12 to 35 millimeters Hg, typically about 17 millimeters Hg. All or preferably a portion of the cooled recycle aqueous liquor is sprayed through nozzles in the mid-region of the hydrogen sulfide scrubber when the partial pressure of ammonia gas is less than the partial pressure of ammonia gas in the cooled recycle aqueous liquor, for example, about 7 millimeters Hg. The differential partial pressure of the released ammonia gas in this process is thus between about 12 and 35 millimeters Hg, depending on the flow velocity in the nozzles and the resulting pressure reduction. A portion of the washing liquor in the hydrogen sulfide scrubber, corresponding to the amount of sprayed-in liquor, is withdrawn from the hydrogen sulfide scrubber below the nozzles and is introduced into the top of the hydrogen sulfide scrubber along with aqueous washing solution which may be obtained from an ammonia stripper or which possibly includes a portion of the stream of recycle aqueous liquor.

In a preferred embodiment of the invention, about 40 to 60 percent of the recycle aqueous liquor is sprayed at an elevated pressure, preferably not more than 2 bar, through the nozzles into the mid-region of the hydrogen sulfide scrubber and the remainder of the recycle aqueous liquor is introduced into the top of the hydrogen sulfide scrubber along with washing liquor obtained from the ammonia stripper. Preferably the recycle aqueous ammonia liquor is cooled to a temperature of 25 to 35 degrees C. before being supplied to the nozzles in the hydrogen sulfide scrubber. The cooled, recycle aqueous ammonia liquor, upon release from the nozzles, generates ammonia vapors at a partial pressure which is greater than the existing ammonia partial pressure in the nozzle region. The temperature of the liberated vapors and the temperature of the stripper scrubbing water is typically about 25 degrees C. The weak ammonia concentration of the stripper scrubbing water is about 12 to 35 millimeters Hg. This relatively low temperature and low ammonia concentration substantially protect the system from corrosion.

A particular advantage of the invention is that a considerable portion of the ammonia vapor released from the recycle aqueous ammonia liquor enters the coke oven gas. The reason is that a negative pressure occurs during the spraying from the nozzles which greatly reduces the solubility of ammonia in the recycle aqueous liquor. The ammonia gas released from the sprayed recycle aqueous liquor enriches the upwardly-moving stream of co,ke oven gas within the hydrogen sulfide scrubber.

When the present invention is practiced, there is a reduction in the concentration of ammonia which is supplied to the top of the hydrogen sulfide scrubber. A steep partial pressure gradient for the ammonia between the gas phase and the liquid phase results in ammonia absorption in the top portion of the hydrogen sulfide scrubber and selective absorption of hydrogen sulfide rather than carbon dioxide—that is, only a small amount of carbon dioxide from the coke oven gas is absorbed in the liquor in the hydrogen sulfide scrubber.

BRIEF DESCRIPTION OF THE DRAWING

The FIRURE illustrates a flow diagram of a familiar ammonium sulfide process for removing hydrogen sulfide from coke oven gas showing the improvements of this invention.

DESCRIPTION OF THE PREFERRED EMBODIMENTS

Referring to the drawing, coke oven gas containing hydrogen sulfide enters into a hydrogen sulfide scrubber 2 through a conduit 1. Coke oven gas having a reduced content of hydrogen sulfide is withdrawn from the scrubber 2 through a conduit 3. Washing solution is introduced into the scrubber 2 through a conduit 21 at the top. An aqueous solution containing dissolved hydrogen sulfide is withdrawn from the base of the scrubber 2 and delivered through a conduit 4 and a conduit 5 to the top of a deacidifier 6. The main portion of the aqueous solution is delivered through the conduits 4 and 8 through a heat exchanger 7 into the upper portion of the deacidifier 6. In the deacidifier 6, hydrogen sulfide is separated from the aqueous solution and is recovered through a conduit 9 for further processing, for example, in a hydrogen sulfide saturation plant (not shown). The aqueous stream from the deacidifier is recovered from the base of the deacidifier 6 and is delivered through a conduit 10 to an ammonia stripper 11. Steam is introduced into the ammonia stripper 11 through a conduit 12 to strip ammonia gas which is withdrawn through a conduit 13 and introduced into the mid-region of the deacidifier 6. A liquid stream of ammonia water is delivered from the mid-region of the stripper 11 through a conduit 14 into the base of the deacidifier 6. An aqueous liquor from the ammonia stripper 11 is withdrawn through a conduit 15 and a pump 16 for use as washing water through conduit 25 to the conduit 21 or for discharge into a drain.

An alternate portion of the aqueous liquor from the base of the deacidifier 6 is delivered from conduit 10 through a conduit 24, through heat exchanger 7 and through a cooler 22 which is supplied with independent cooling water. Preferably the cooler 22 reduces the temperature of the aqueous liquor to a range of 20 to 35 degrees C. The ammonia content is about 17 grams per liter of the cooled nozzle aqueous liquor. From 40 to 60 weight percent of the recycle aqueous liquor is, according to this invention, pumped through a pump 17 and, at an elevated pressure, into nozzles 18 which are positioned within the mid-region of the hydrogen sulfide scrubber 2. A portion of the recycle aqueous liquor may be added as wash water in the hydrogen sulfide scrubber 2 through the conduit 20, 21. The elevated pressure is not critical although some pressure is required for spraying through nozzles. Preferably the pressure is less than 2 bar. The aqueous ammonia liquor from the nozzles 18 has a high flow velocity with the result that a considerable negative pressure is achieved and the solubility of ammonia is reduced. Consequently, a considerable portion of the ammonia is vaporized from the liquor and combines with the upwardly flowing coke oven gases in the hydrogen sulfide scrubber 2. The partial pressure of the released ammonia vapor is from 12 to 35 millimeters Hg, typically, about 17 mm. Hg. The partial pressure of ammonia in the region of the nozzles typically is about 7 mm. Hg. Thus a partial pressure differential for the released ammonia is about 12 to 35 millimeters Hg.

A quantity of partially degassed liquor is withdrawn through the conduit 23 from the hydrogen sulfide scrubber at a level below the spray nozzles 18 and is delivered by a pump 19 through the conduit 21 at the top of the hydrogen sulfide scrubber 2 where it constitutes a portion of the aqueous wash water for the hydrogen sulfide scrubber. The amount of aqueous liquor withdrawn through the conduit 23 corresponds to the amount of aqueous liquor which is introduced into the spray nozzles 18. Because of the steep ammonia partial pressure gradient between gas and liquid, the aqueous liquor of low ammonia concentration initially will absorb ammonia gas and then almost immediately selectively will absorb hydrogen sulfide. As a result only a small amount of carbon dioxide from the coke oven gases is absorbed in the aqueous liquor. The resulting liquid from top of the hydrogen sulfide scrubber 2 is delivered through the conduit 21 from the cooled recycle aqueous ammonia liquid of conduit 19; the recycle stream of conduit 23; and, if desired, aqueous liquor from the ammonia scrubber conduit 15, 25.

SUMMARY

This method of liberating ammonia has an advantage over the prior art in that the temperature of the liberated ammonia vapors and the temperature of the stripped washing liquor is reduced, preferably 25 to 30 degrees C., thereby protecting the system from excessive corrosion. The requirements for cooling water and for cooling equipment are reduced when compared with prior art installations.

I claim:

1. In the ammonium sulfide method of washing hydrogen sulfide from coke oven gas including a hydrogen sulfide scrubber for which
   (1) coke oven gas containing hydrogen sulfide is introduced into the bottom of the said scrubber;
   (2) coke oven gas having a reduced hydrogen sulfide content is recovered from the top of the said scrubber;
   (3) aqueous ammonia wash water is introduced into the top of the said scrubber; and
   (4) aqueous ammonia wash liquor containing dissolved hydrogen sulfide is withdrawn as a scrubber bottom stream from the bottom of the said scrubber, the improvement comprising:
   removing hydrogen sulfide from the said scrubber bottom stream to produce a deacidified stream comprising weak aqueous ammonia, cooling said deacidified stream of weak aqueous ammonia to a temperature of 20 to 30 degrees C.;
   introducing the cooled deacidified stream of weak aqueous ammonia liquor at a temperature of 20 to 30 degrees C. and an ammonia content of 15 to 25 grams per liter at a high velocity through spray nozzles in the mid-region of the said scrubber to release ammonia vapor in the mid-region of said scrubber at a higher partial pressure than the partial pressure of ammonia in the region of the nozzles, and withdrawing from the said scrubber below the said nozzles a side stream of weak aqueous ammonia liquor corresponding in volume to the said cooled deacidified stream and introducing said side stream into the top of said scrubber.

2. The improvement of claim 1 wherein 40 to 60 percent of the weight of the said cooled aqueous ammonia liquor is sprayed through the said nozzles and the remainder of the said cooled aqueous ammonia liquor is introduced into the top of the said hydrogen sulfide scrubber.

3. The improvement of claim 1 wherein the said ammonia vapor is released in the said mid-region of the said scrubber at a partial pressure of 12 to 35 millimeters Hg.

4. The improvement of claim 3 wherein partial pressure differential between that of the released ammonia gas and that in the said mid-region of the said scrubber is 12 to 35 millimeters Hg.

* * * * *